United States Patent
Katayama et al.

(10) Patent No.: US 6,786,659 B1
(45) Date of Patent: Sep. 7, 2004

(54) PRINTING APPARATUS AND COLOR ADJUSTING METHOD

(75) Inventors: Ryogo Katayama, Kanagawa (JP); Teruyasu Hanagami, Kanagawa (JP)

(73) Assignee: Sony Corporation, Tokyo (JP)

( * ) Notice: Subject to any disclaimer, the term of this patent is extended or adjusted under 35 U.S.C. 154(b) by 53 days.

(21) Appl. No.: 09/616,331

(22) Filed: Jul. 15, 2000

(30) Foreign Application Priority Data

Jul. 16, 1999 (JP) .......................................... P11-203724

(51) Int. Cl.⁷ ................................................ B41J 5/30
(52) U.S. Cl. ............................ 400/62; 400/70; 358/1.9
(58) Field of Search ............................. 400/62, 61, 70, 400/76, 80; 358/1.9, 500, 530, 538

(56) References Cited

U.S. PATENT DOCUMENTS

| | | | |
|---|---|---|---|
| 4,958,221 A | 9/1990 | Tsuboi et al. ................ 358/538 |
| 4,962,421 A | 10/1990 | Murai ......................... 358/530 |
| 5,204,736 A | 4/1993 | Abe ........................... 358/500 |
| 5,504,821 A | * 4/1996 | Kanamori et al. ........... 382/167 |
| 5,902,053 A | * 5/1999 | Ikemoto et al. ......... 400/120.07 |
| 5,995,714 A | 11/1999 | Hadley et al. ................ 358/1.9 |

FOREIGN PATENT DOCUMENTS

| | | | |
|---|---|---|---|
| EP | 0 683 598 A2 | 11/1995 | |
| JP | 4-137974 | * 5/1992 | |
| JP | 09252413 A | * 9/1997 | ............ H04N/1/60 |

OTHER PUBLICATIONS

Copy of International Search Report.

* cited by examiner

Primary Examiner—Minh Chau
(74) Attorney, Agent, or Firm—Reed Smith LLP; John W. Carpenter

(57) ABSTRACT

With conventional analog printers, ordinary users are experienced in the subtract color mixture for adjustment of image colors. Therefore, when adjusting the colors in an image displayed on a monitor of a video player and set by the additive color mixture, a user has difficulty if not familiar with the complementary relation between colors. The present invention proposes a printer and color adjusting method in which images of which a designated portion changed in color balance using a gamma (γ) data table in an image processor are printed in one printing paper and the user is prompted to select one of the images for storage in the printer. Thus, the user can select an image having colors he desires from images actually used and set the selected data into the printer. Thus, after the color adjustment, a desired print whose set colors are automatically stored can be provided.

26 Claims, 8 Drawing Sheets

PRINTING APPARATUS AND COLOR ADJUSTING METHOD

BACKGROUND OF THE INVENTION

1. Field of the Invention

The present invention relates to a printing apparatus and color adjusting method, in which a desired color adjustment can easily be done of an input analog video signal before the signal is printed on a printing paper.

2. Description of the Related Art

With the conventional printer to print an input analog video signal on a printing paper, the user adjusts colors such as yellow (Y), magenta (M) and cyan (C) by printing the signal on the printing paper while displaying red (R), green (G) and blue (B) colors of the signal on a monitor.

Generally, many of the ordinary users have experiences with the subtractive mixture of colors in the adjustment of image colors. Thus, when adjusting additive process-based colors of an image being displayed on a video monitor for example, such a user can make no matching between the colors if he or she is not well familiar with the complementary relationship between the colors. Also since there exists a different in basic color appearance characteristic between the video monitor and print, it is difficult to accurately correlate color variations on the monitor with those in the print. Thus, in the conventional color matching, it is necessary to repeatedly adjust and print the colors until a user's ideal hue is attained. Therefore, the conventional color matching consumes printing materials such as printing paper, ink ribbon, etc. very much. Also, it takes much time and great costs.

That is, the color matching with the conventional technique requires great costs (large consumption of printing paper, for example) and much time and in addition, needs knowledge of the colors. Therefore, the ordinary users cannot easily adjust image colors.

OBJECT AND SUMMARY OF THE INVENTION

Accordingly, the present invention has an object to overcome the above-mentioned drawbacks of the prior art by providing a printer and color adjusting method, in which image colors can be adjusted easily, quickly and inexpensively.

The above object can be attained by providing a printer to print a video signal using printing media including a printing ink ribbon and paper, the printer including according to the present invention:

an image processing means for storing a plurality of data different from each other in a value on which the color appearance characteristic of the printing media depends and converting, using the plurality of data, an image composed of R, G and B video signals based on the video signal to a complementary-color image consisting of a desired number of frames; and means for printing an output from the image processing means using the printing media.

Also the above object can be attained by providing a color adjusting method for use in a printer to print a video signal using printing media including a printing ink ribbon and paper, the method including, according to the present invention, steps of:

storing a plurality of data different from each other in a value on which the color appearance characteristic of the printing media depends and converting, using the video signal, an image composed of R, G and B video signals based on the video signal to a complementary-color image consisting of a desired number of frames;

printing an output from the image processing step using the printing media;

selecting a desired one of the plurality of images printed on the printing paper at the printing step; and adjusting the colors according to the desired image selected at the selecting step.

More specifically, an important portion (for which color matching is to be done) on the monitor screen is designated and a plurality of images different in color balance from each other is printed out on one printing paper. Favorite ones are selected from the plurality of printed images and stored into the printer, thus permitting to easily realize a desired color matching.

According to the present invention, the color matching can be done by printing once instead of the conventional cut-and-try method (which takes much time and large costs). The color matching is possible without many prints (tens of prints as the case may be). Thus, it is possible to considerably cut the time and cost for the color matching.

Furthermore, according to the present invention, a desired color matching can easily be done without necessary knowledge for the color adjustment (yellow is a complementary color of blue, for example). Actually, a user's sensation of a color will hardly result in a successful color matching. The simplicity of the color matching and reduction of time for the color matching owing to the present invention will greatly contribute to the operability of the printer.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

An embodiment of the printer according to the present invention will be described herebelow. The embodiment of the printer carries out the color adjusting method.

Figure 1:
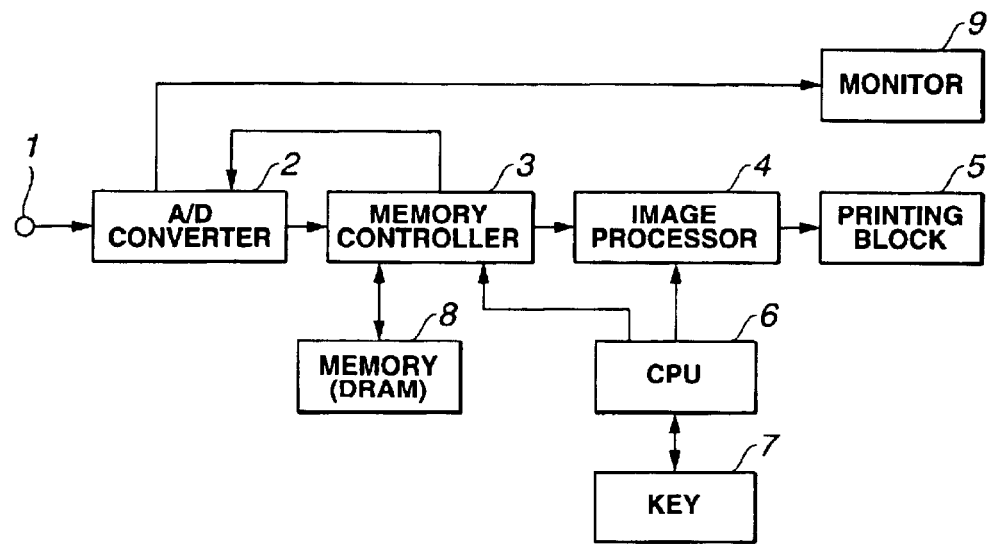
FIG. 1 is a schematic block diagram of an embodiment of the printer according to the present invention.

Referring now to FIG. 1, there is schematically illustrated in the form of a block diagram then embodiment of the printer according to the present invention. The printer is intended to produce, on a printing paper, a hard copy output of an analog image signal from an input device such as a camera. As shown, analog R, G and B signals supplied at an input terminal are converted by an A/D converter 2 to digital R, G and B signals, respectively, and stored into a memory (DRAM) for example via a memory controller 3.

The digital R, G and B signals read from the memory 8 by the memory controller 3 are passed to an image processor 4 in which they will be subjected to sharpness processing (enhancement), gamma (γ)correction, etc. The gamma (γ) correction will further be described later. The printer has a printing block 5 provided with a thermal print head for example. An output from the image processor 4 is supplied to the printing block 5 which will print, by the thermal print head, the output signal on a printing paper. Operations of the memory controller 3 and image processor 4 are controlled by a central processing unit (CPU) 6. The CPU 6 has a keyboard or keypad (shown as KEY) 7 connected thereto. The printer includes also a monitor 9. The output from the A/D converter 2 is sent to and displayed on the monitor 9. The monitor of the input device may be used as the monitor 9.

First, the gamma (γ) correction effected in the image processor 4 will be described herebelow. The printing block 5 uses a sublimation ink ribbon and printing paper as printing media. When the sublimation ink ribbon is heated, the ink in the ribbon will be sublimed to color the printing paper. The color appearance characteristic varies greatly depending upon the printing media used.

Figure 2:
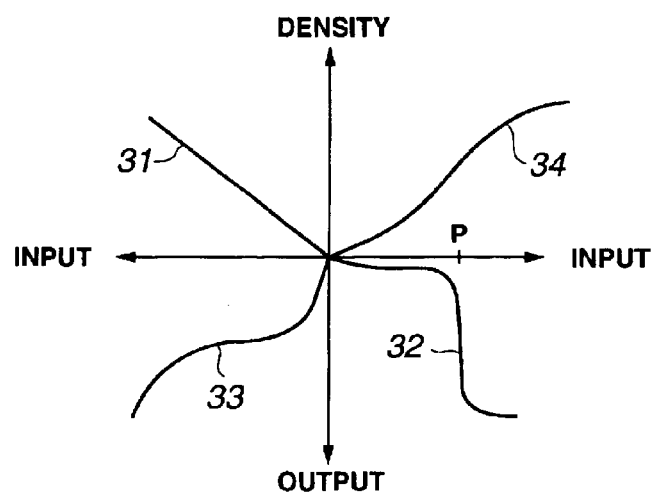
FIG. 2 shows characteristic curves of digital data (for one color) converted from analog to digital by the A/D converter in the printer in FIG. 1.
Figure 3:
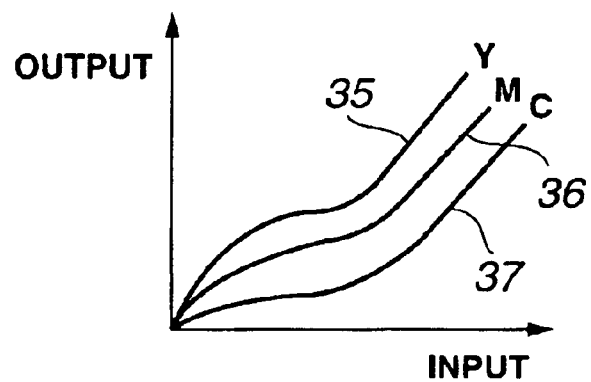
FIG. 3 show input-output characteristic curves of Y, M and C.

FIG. 2 shows characteristic curves of digital data converted from analog to digital by the A/D converter 2 in the printer in FIG. 1. There is shown at the upper left of FIG. 2 a characteristic curve 31 of the digital data (for one color) converted from analog to digital by the A/D converter 2. The digital data showing this characteristic curve 31 is an 8-bit data for example and variable in value correspondingly to 256 points (0 to 255). Ideally, the color appearance characteristic of image data to be printed should preferably be approximately a one represented by the characteristic curve 31. Actually, however, the color appearance characteristic depicts a curve 32 which will fall abruptly at a point p as shown at the lower right of FIG. 2. This color appearance characteristic 32 varies depending upon the printing media including the sublimation ink ribbon and printing paper. If the data from the memory controller 3 maintains the color appearance characteristic 32, the thermal prin head in the printing block 5 will print output an image quite different from the input image from the input device such as camera. To avoid this, the image processor 4 converts the actual color appearance characteristic 32 to a printed color appearance characteristic 34 shown at the upper right of FIG. 2 using a gamma (γ) data characteristic 33 shown at the lower left of FIG. 2 and which controls the color appearance characteristic 32. This is the gamma (γ) correction. The image processor 4 has a memory for the above gamma (γ) correction as a gamma (γ) data table which will further be described later. Colors printed by the printing block 5 are adjusted by the subtractive mixture of Y, M and C. The gamma (γ) data table stores data being a combination of Y curve 35, M curve 36 and C curve 37 shown in FIG. 3. In the printer according to the present invention, digital R, G and B signals from the memory (DRAM) 3 in FIG. 1 are converted to Y, M and C signals by the image processor 4 using a YMC converter which will be described later. Also, the Y, M and C signals are subjected to the gamma (γ) correction using the gamma (γ) data table.

In many cases, the printer shown in FIG. 1 is used in connection with a camera, medical endoscope, etc. Normally, a monitor device is connected to the camera or endoscope and thus generally the user observes the colors on the monitor screen. Conventionally, the colors in which an image is printed on a printing paper by the printing block 5 are also adjusted on the monitor screen. However, the colors on the monitor are adjusted by the additive mixture of R, G and B while the colors printed by the printing block 5 are adjusted by the subtractive mixture of Y, M and C. Therefore, the user cannot correctly adjust the colors unless he has a full understanding of the complementary relation between the R, G and B, and Y, M and C.

The printer according to the present invention adopts a color adjusting method in which using the gamma (γ) data table in the image processor 4, it prints on a printing paper a plurality of images different from each other in color balance in portions thereof designed on the monitor screen, and the user is prompted to select his favorite one of the images and have the printer store it, thereby permitting to easily effect a desired color matching. Thus, the user can select an image having his desired colors from images he actually uses, and sets the selection information in the printer. After the color adjustment, the stored color setting will automatically result in a print in desired colors.

Figure 4A:
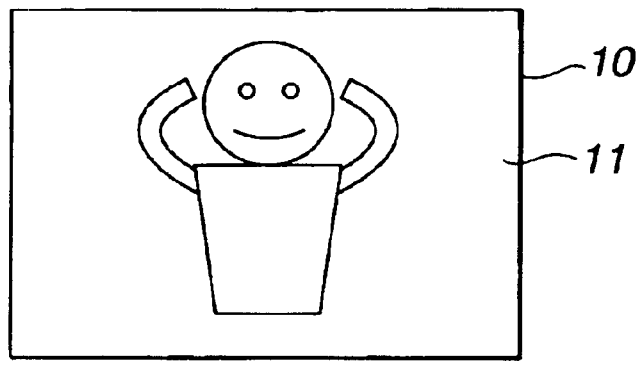
FIG. 4 shows how to capture an image on the monitor screen.
Figure 4B:
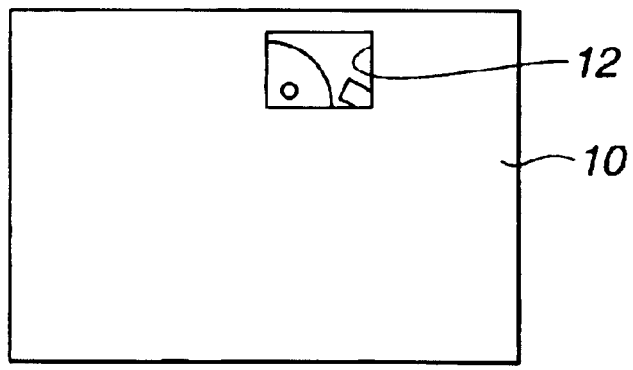
Figure 5:
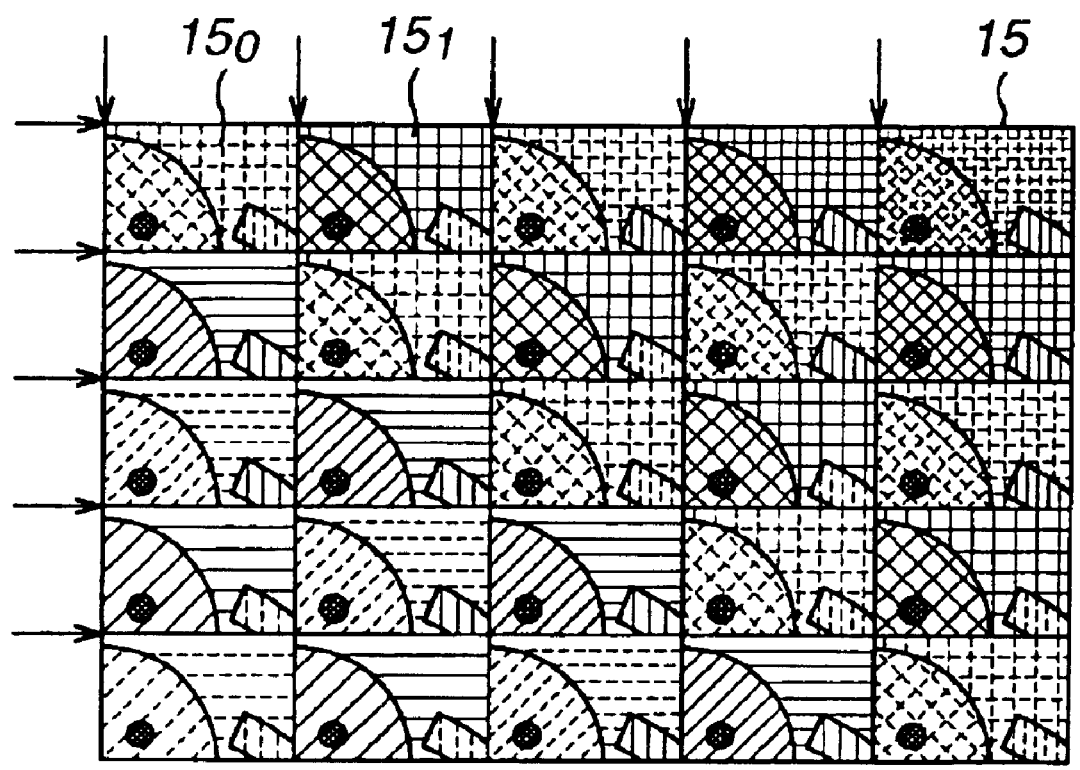
FIG. 5 shows 25 areas (frame) in one print, made different in hue from each other for the purpose of the color matching.
Figure 6:
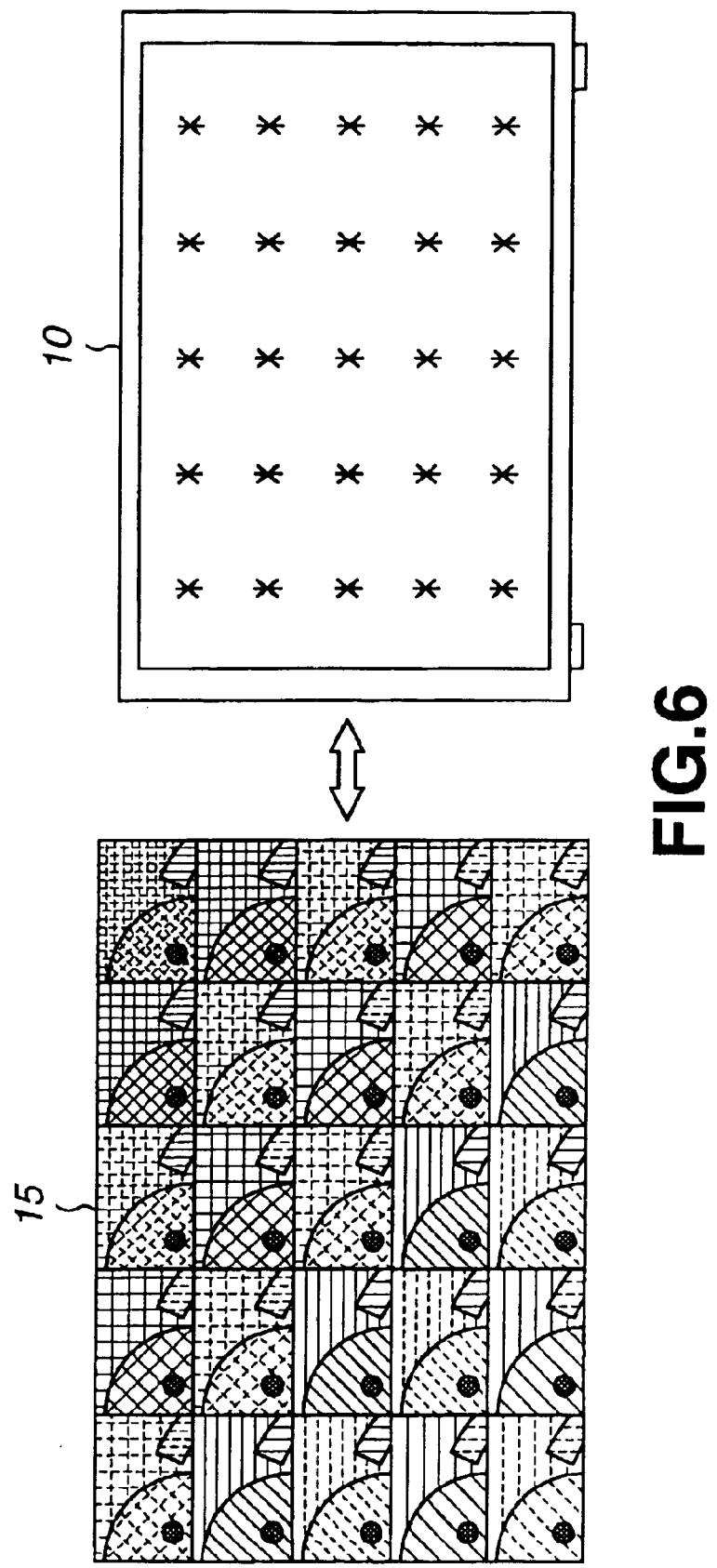
FIG. 6 show the correspondence between the frames in the print in FIG. 5 and asterisks (*) on the monitor screen.

The color adjusting method will further described herebelow with reference to FIGS. 4 to 6. FIG. 4 shows how to capture an image on a monitor screen 10, FIG. 5 shows 25 areas (frame) in one print, made different in hue from each other for the purpose of the color matching, and FIG. 6 show the correspondence of the frames in the print in FIG. 5 with asterisks (*) on the monitor screen. As shown in FIG. 4A, an input image 11 is first captured on the monitor screen 10. Next, the printer gets into the color matching mode and the user is prompted to select an area 12 in where the color matching is to be done. Further, the selected area 12 is printed for duplication for the purpose of the color matching as shown in FIG. 5. In one print 15, there will be printed 25 areas (frames), for example, made different in hue from each other for the purpose of the color matching. The user is prompted to select his favorite ones from the printed 25 frames different in hue from each other, and register them in the printer.

In addition, a desired number of frames in a desired number of columns is printed. In the above embodiment, the images or frames in the print, different in hue from each other, count 25 in number. As illustrated in FIG. 5, the desired number of columns is 5 by 5 rows for the total of 25 times. However, the number of the printed frames, namely, 25 frames, is just a not-limitative one. It may be 9, 49, 16 or 36 frames, for example.

Then, asterisks (*) corresponding to the frames are displayed on the monitor screen 10, as shown in FIG. 6. Using the cursor move keys provided on the keyboard or keypad 7 of the printer, the user will set the asterisks (*) on the monitor screen 10 at positions corresponding to his desired images while watching the print 15, and press the set key (EXEC) or the like to register the asterisks (*) in the printer.

Figure 7:
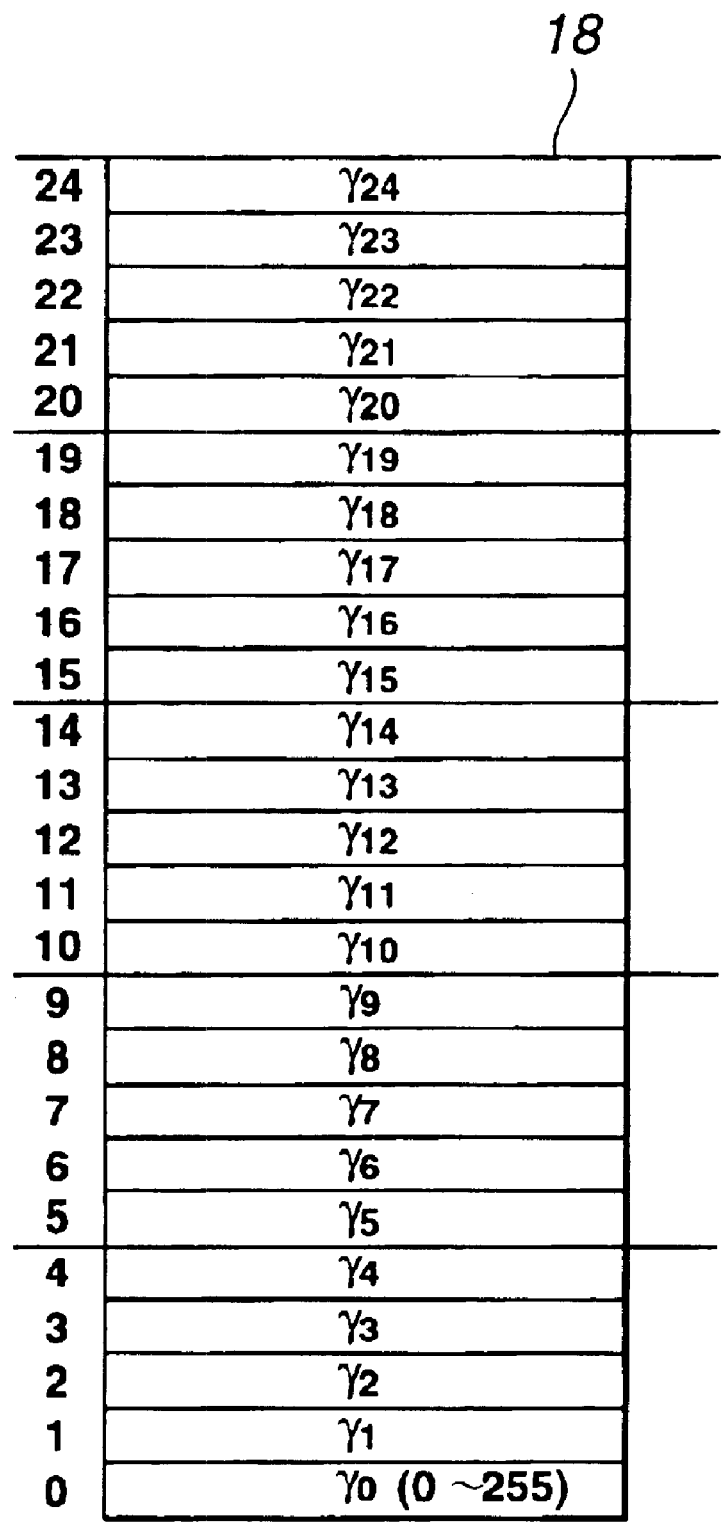
FIG. 7 shows a gamma (γ) data table.

The printer is constructed and operates to carry out the aforementioned color adjusting method as will be described in detail below with reference to FIGS. 7 to 10. In FIG. 7, the above gamma (γ) data table is indicated with a reference 18.

FIG. 7 shows the construction of the gamma (γ) data table 18. To produce an image of 25 frames for example, the table 18 stores at addresses 0 to 24 data $\gamma_0$ to $\gamma_{24}$, for example, each of which is a combination of Y, M and C shown in FIG. 3. The combination of Y, M and C can be represented with an 8-bit data (0 to 255) for example. Normally, a color is determined by the combination of three colors Y, M and C at the time of printing. By changing the distribution of the Y, M and C little by little for each of the 25 frames in the image, it is possible to lay frames different from reference images in a predetermined distribution pattern. In FIG. 5 for example, a print $15_0$ uses the data $\gamma_0$ and a print $15_1$ uses the data $\gamma_1$. The data $\gamma_0$ to $\gamma_{24}$ are necessary for production of an image of 25 frames. When an image of 49 frames different in hue from each other is used, data $\gamma_0$ to $\gamma_{48}$ are required.

The 25 frames in a print 15 shown in FIG. 5 form a matrix of 5 frames per column by 5 frames per row. The address of the gamma ($\gamma$) data table 18 is changed by the image processor 4 to divide, by 5, the main scanning direction (one line)of the thermal print head of the printing block 5 while dividing the sub scanning direction by 5. Of course, 49 frames in a printed image include 7 frames in column by 7 frames in row.

Figure 8:
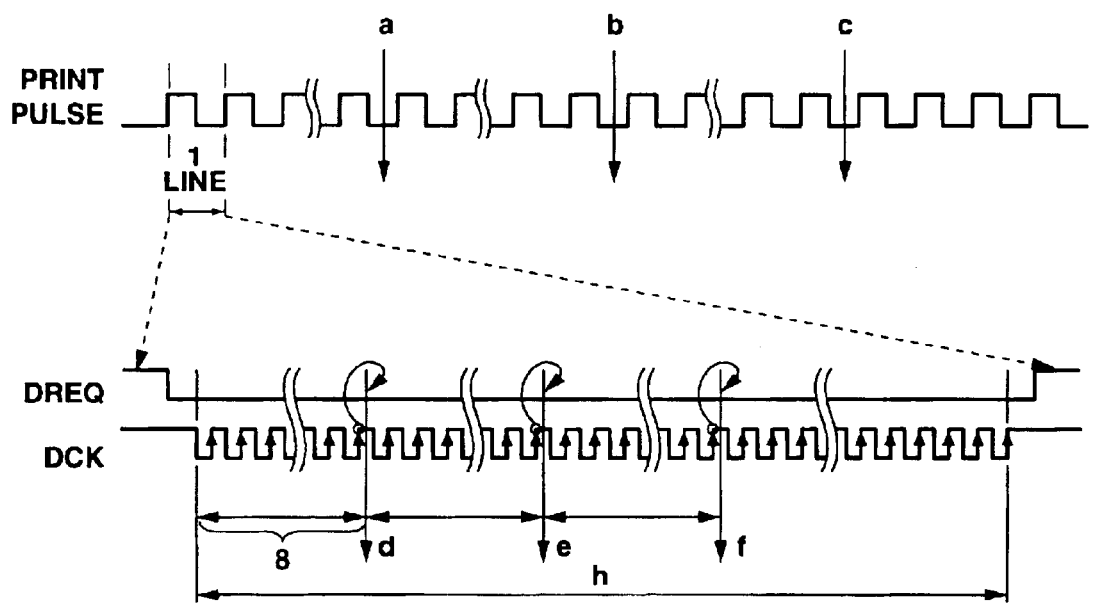
FIG. 8 is a timing chart showing times at which address in the gamma (γ) correction memory (table) is changed from one to another in one line printed by the thermal print head.

FIG. 8 is a timing chart showing times at which address in the gamma correction memory (table) 18 is changed from one to another in one line being printed by the thermal print head. The thermal print head has an internal shift register. The thermal print head prints data for a number of dots for one line while storing the data in the internal shift register with the main and sub scanning directions being changed. In FIG. 8, one print pulse is for one line. In the one line, a number g of dots in the main scanning direction for one frame can be set in dots, and the address in the gamma ($\gamma$) data table 18 is changed per frame correspondingly to a set number of dots. The transfer rate of the data for the set number of dots is synchronous with a data clock DCK. Since the change of address in the gamma ($\gamma$) data table 18 in one line at times d, e and f in FIG. 8 cannot be done by the software because the transfer rate is very high, so it is done by the hardware in the present invention. On the other hand, since the data transfer has not to be done at so high a speed at times a, b and c in FIG. 8, the address change in the sub scanning direction is done by the software under the control of the CPU 6.

Figure 9:
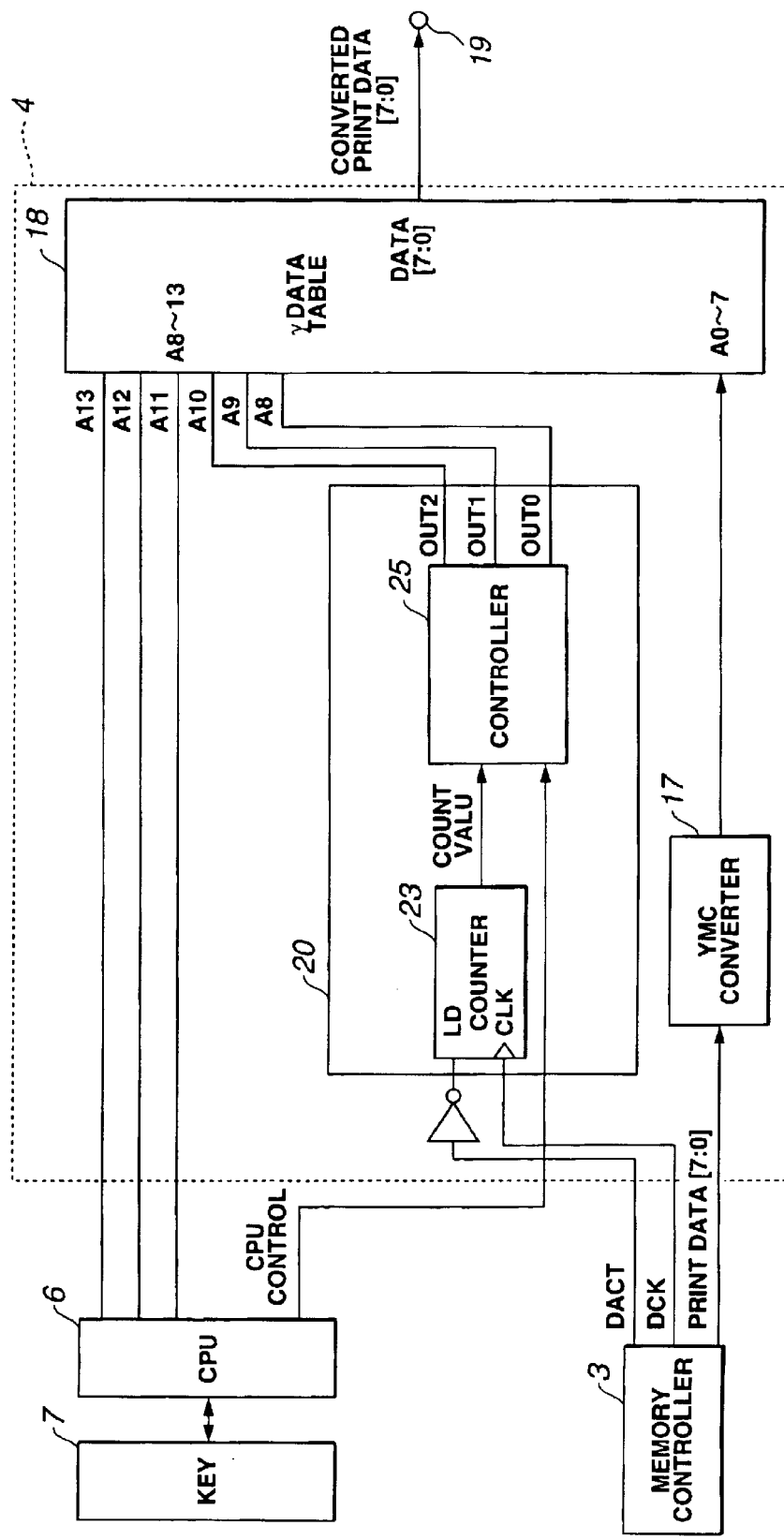
FIG. 9 is a block diagram of the image processor in the printer in FIG. 1.

Referring now to FIG. 9, there is illustrated in the form of a block diagram the image processor in the printer in FIG. 1. The image processor 4 to effect the aforementioned address change in the gamma ($\gamma$) data table 18 in the main and sub scanning directions and YMC conversion will further be described herebelow with reference to FIG. 9. As shown, the image processor 4 includes a YMC converter 17 to convert the R, G and B data read from the memory 8 via the memory controller 3 to Y, M and C print data, a gamma ($\gamma$) data table 18 provided for use to effect the aforementioned gamma ($\gamma$) correction of the Y, M and C print data from the YMC converter 17, and an address change controller 20 to supply the gamma ($\gamma$) data table 18 with an address change signal for the address change in the main scanning direction.

The YMC converter 17 converts the R, G and B data by inverting to provide Y, M and C print data as in the following:

When supplied with R, G and B data in 8 bits for example from the memory 8 via the memory controller 3, the YMC converter 17 converts the R, G and B data to Y, M and C print data of 8 bits and supplies them to A0–7 of the gamma ($\gamma$) data table 18. The Y, M and C data supplied to A0–7 are changed in hue using 25 gamma ($\gamma$) data $\gamma_0$ to $\gamma_{24}$ stored in the gamma ($\gamma$) data table 18.

The change of the gamma ($\gamma$) data for one line of the thermal print head, shown in FIG. 8, is effected with a change signal from the address change controller 20. The address change in the sub scanning direction in the gamma ($\gamma$) data table 18 is effected by the software by CPU 6 as in the above.

The address change controller 20 includes a counter 23 which is supplied at a CLK terminal thereof with a data clock DCK sent via the memory controller 3 and counts dots in the main scanning direction, and an address controller 25 to generate main scanning-directional address change signals of 3 bits (OUT0, OUT1 and OUT2) for example based on a count COUNT VALUE from the counter 23 and a control signal CPU CONTROL from the CPU 6 to control the main scanning-directional address in the gamma ($\gamma$) data table 18.

Figure 10:
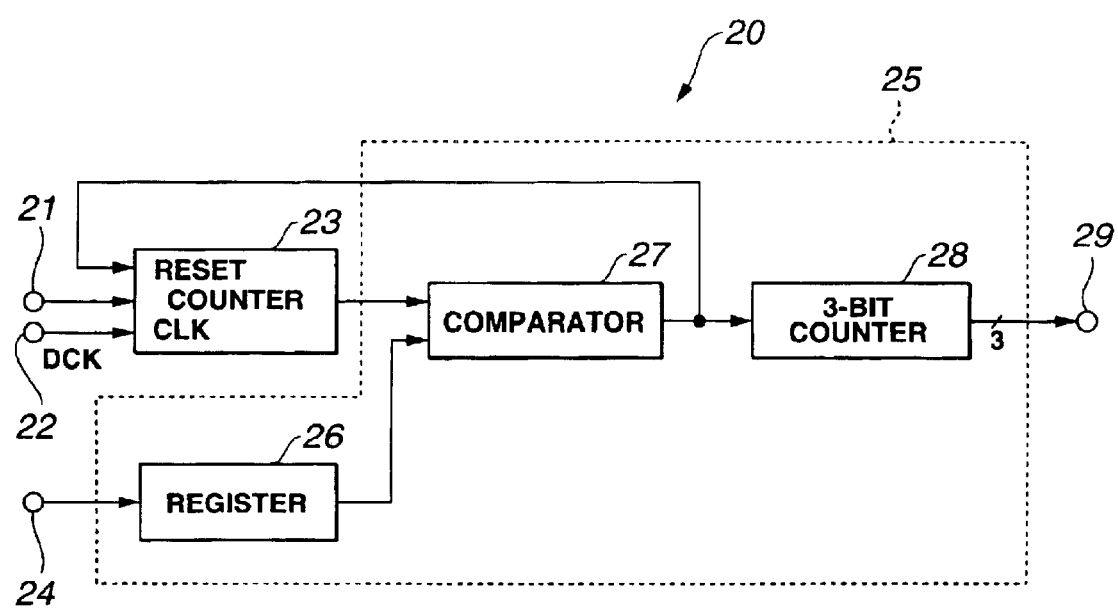
FIG. 10 is a block diagram of the address changeover control circuit in the image processor in FIG. 9.

FIG. 10 is a block diagram of the address controller 25 in the image processor 4 in FIG. 9. As shown, the address controller 25 includes a register 26 which there is stored a number of dots counted in the main scanning direction for one frame, which will be the control signal CPU CONTROL from CPU 6, a comparator 27 to make comparison between the number of dots (reference value) supplied from the register 26 and a count from the counter 23 to determine whether they are same as each other, and a 3-bit counter 28 to count up when supplied with a one-shot pulse produced by the comparison 27 when the count is equal to the reference value.

The 3-bit main scanning-directional address change signals OUT0, OUT1 and OUT2 are necessary for a maximum of 8 divisions in the direction of one line. For a maximum of 4 divisions in the direction of one line, 2-bit main scanning-directional address change signals are required. For 9 divisions in the direction of one line, 4-bits main scanning-directional address change signals are required for a maximum of 16 divisions. That is, the main scanning-directional address change signals are required for a number of bits for a number of frames.

When the reference value set in the register 26 is equals to a count of dots in the main scanning direction, counted by the counter 23, the comparator 27 will produce a one-shot pulse and supply it to the 3-bit counter 28. It is possible to change the address of gamma ($\gamma$) data for 5 frames in the main scanning direction using the 3 bits from the 3-bit counter 28. The one-shot pulse from the comparator 27 is fed back to the counter 23 to reset the count in the counter 23 so that one frame can be set in dots, after completion of counting for one frame.

The image processor 4 generates image data for 25 frames changed in hue, and supplies the data to the printing block 5 which will print the image of 25 frames as shown in FIG. 5 on a printing medium by the thermal print head.

The image frames in the print 15 are made to correspond to the asterisks (*) on the monitor screen 10 as shown in FIG. 6. The asterisk (*) on the monitor screen 10 is set in a position corresponding to a desired image by operating the cursor key on the keyboard of the printer, and the desired image is registered in the printer by operating the set key (EXEC) key or the like.

Then, the image 11 shown in FIG. 4A is adjusted in color in the image processor 4 based on a selected gamma ($\gamma$) data and printed out.

Thus, the color adjustment can be done at the printer shown in FIG. 1.

Note that it is also possible to display the desired images selected on the monitor screen 10 as shown in FIG. 6 by moving it about a reference one of the selected images and changing the gamma (γ) data based on the reference image. The gamma (γ) data may newly be acquired by calculation and stored at updated addresses in the gamma (γ) data table 18.

According to the above embodiment of the present invention, first, the user can adjust the colors without knowing about the color matching. In the color matching, the ordinary user is experienced in the subtractive mixture of colors. In this case, the user cannot adjust the color of an image in colors obtained by the additive mixture, displayed on the monitor of a video player for example if he has no knowledge of the complementary relation between the colors. Also since the image displayed on the monitor is different in basic color appearance characteristic from the printed image, it is difficult to accurately correlate color variations in the image displayed on the monitor with those in the printed image. According to the present invention, the user can judge the color matching based on a final print (the user wants to have eventually), so he can adjust the colors without the aforementioned knowledge of the complementary relation between colors.

Secondly, the color matching can be done with reduced costs and time. In the conventional color matching, the "adjust and print" has to be repeated for the above reasons until a desired ideal hue is attained. As the result, printing material and time are wasted. According to the present invention, however, the printing material and time can be saved considerably.

Thirdly, no time is required for processing data in the memory. If it is intended to implement only the above two effects, an extra memory may be provided for use to process, therein, images different in hue from each other. In this case, however, the cost for the extra memory and time for image distribution at addresses in the memory are disadvantageous. With the color adjusting method according to the present invention, the image colors can be real-time adjusted, so no time for data processing is required. No cost for such an extra memory is required and no firmware is required to support the extra memory.

Fourthly, a variation from one printing medium to another can be absorbed. For example, even if the ink ribbon shows a poor appearance characteristic of any color, the variation from one ink ribbon to another can be absorbed by adjusting the color by the color adjusting method according to the present invention.

As having been described in the foregoing, the present invention can provide a printer and color adjusting method in which the color adjustment can be done in short time and with low cost. That is, the consumption of the printing paper can be reduced during the color adjustment. The color adjustment can be done in a reduced time. The user can easily effect the color adjustment even with no knowledge of the colors. No extra memory is required for distribution of images at addresses in the memory and no hardware and firmware are required for support such an extra memory.

What is claimed is:

1. A printer, comprising:
   an image processing means for,
   storing a plurality of gamma data in an updateable table, each of the plurality of gamma data being different from each other in a value on which a color appearance characteristic of a printing media depends, and
   converting an image composed of R, G, and B signals to a set of Y, M, and C complementary-color images, each image being converted using one of the plurality of gamma data;
   means for selecting a best of the set of Y, M, and C complementary color images; and
   means for adjusting a printing process of the printer with the gamma data used to convert the selected best Y, M, and C complementary color image;
   wherein the means for selecting a best Y, M, and C complementary color images comprises,
   means for selecting, by a user, an important area of a subject image;
   means for creating a plurality of test images, each test image being created by applying an individual one of the data to the important area of the subject image;
   means for printing the test images;
   means for outputting a set of markers, each marker corresponding to one of the printed test images and comprising a graphical representation of the corresponding printed test image but not derived from the test image or subject image, on a display screen; and
   means for retrieving a user selection of the markers.

2. The printer as set forth in claim 1, wherein the table comprises a memory means in which there is stored the plurality of gamma data different from each other in gamma value upon which the color appearance characteristic of the printing medium depends.

3. The printer as set forth in claim 2, wherein the image processing means calculates the plurality of gamma data with reference to a reference image and changes the addresses of the data in the memory means.

4. The printer as set forth in claim 1, wherein the image processing means has a complementary color converter in which the R, G, and B image is converted to the set of Y, M, and C complementary-color images being in the complementary relation with the R, G, and B image.

5. The printer as set forth in claim 4, wherein the conversion to the Y, M, and C complementary-color images for a desired number of frames is effected by an image dividing means which divides the Y, M, and C complementary-color images by a hardware capability of the image processor in a main scanning direction and by a software capability of the image processor in a sub scanning direction to generate Y, M, and C images for a number of columns for display of the frames.

6. The printer as set forth in claim 1, wherein:
   the table is a memory means in which there is stored the plurality of data different from each other in a gamma value upon which the color appearance characteristic of the printing medium depends, and a complementary color converter in which the R, G, and B image is converted to Y, M, and C images being in a complementary relation with the R, G, and B image; and
   the image processor includes means for determining a number of frames for output of the Y, M, and C complementary-color images using the plurality of data.

7. The printer as set forth in claim 6, wherein the conversion to the Y, M, and C complementary-color images for the number of frames is effected by an image dividing means which divides the Y, M, and C complementary-color images by the hardware in a main scanning direction and by the software in a sub scanning direction to generate Y, M, and C images to determine a number of columns to be used to output the frames.

8. The printer as set forth in claim 1, wherein the printer includes a sublimation ink ribbon and the media includes printing paper.

9. The printer according to claim 1, wherein said means for selecting comprises:

means for printing the set of Y, M and C complementary-color images in a test pattern;

means for outputting a selection pattern having a set of markers, each marker respectively corresponding to one of the test pattern images; and means for identifying one of the markers corresponding to a best one of the test pattern images.

10. The printer according to claim 9, further comprising means for updating the updateable table based on a reference image.

11. The printer according to claim 10, wherein the table is updated by acquiring gamma data by calculation and storing each gamma data at addresses in the table.

12. The printer according to claim 10, wherein:

the test pattern images are printed by updating a gamma value used for each line printed by changing an address that reads a corresponding gamma data from the table;

the address is changed in a sub-scanning direction by software; and the address is changed in a main-scanning direction by hardware.

13. A color adjusting method for use in a printer to print a video signal using printing media, the method comprising steps of:

storing a plurality of data different from each other in a value on which a color appearance characteristic of the printing media depends in an updateable table;

converting, using the video signal, an image composed of R, G, and B video signals based on the video signal to complementary-color images to be output in a number of columns;

printing the set of complementary-color images as an output from the converting step using the printing media;

selecting a desired one of the set of complementary-color images as printed on printing paper at the printing step; and adjusting colors of an output image according to the image selected at the selecting step;

wherein the step of selecting a desired one of the set of complementary-color images as printed on printing paper, comprises the steps of, selecting, by a user, an important area of a subject image;

creating a plurality of test images, each test image being created by applying an individual one of the data to the important area of the subject image;

printing the test images;

outputting a set of markers, each marker corresponding to one of the printed test images and comprising a graphical representation of the corresponding printed test image but not derived from the test image or subject image, on a display screen; and retrieving a user selection of the markers.

14. The method as set forth in claim 13 wherein at the step of storing, the plurality of data different from each other are gamma values upon which the color appearance characteristic of the printing media depends is stored.

15. The method as set forth in claim 14, further comprising the step of updating the table with a set of gamma values based on a reference image.

16. The method as set forth in claim 13, wherein at the converting step, the R, G, and B images are converted to Y, M, and C images being in the complementary relation with the R, G, and B images and further to Y, M, and C complementary-color images for a desired number of columns based on capabilities of an image processor performing the conversion.

17. The method as set forth in claim 16, wherein the conversion to the Y, M, and C complementary-color images for the desired number of columns is effected by dividing the Y, M, and C complementary-color images by a hardware capability of the image processor in a main scanning direction and by a software capability of the image processor in a sub scanning direction to generate Y, M, and C images for the desired number of columns.

18. The method as set forth in claim 13, wherein the plurality of data are different from each other in gamma value upon which the color appearance characteristic of the printing media depends, and the R, G, and B are converted to Y, M, and C images being in the complementary relation with the R, G, and B image and further to Y, M, and C complementary-color images in a desired number of frames using the plurality of data.

19. The method as set forth in claim 18, wherein the conversion to the Y, M, and C complementary-color images for the desired number of frames is effected by dividing the Y, M, and C complementary-color images by a hardware capability of the image processor in a main scanning direction and by a software capability of the image processor in a sub scanning direction to generate Y, M, and C images for a number of columns in which the converted images are to be output.

20. The method as set forth in claim 13 wherein the printing media includes a sublimation ink ribbon and printing paper.

21. The method as set forth in claim 13, wherein at the selecting step, the desired image is selected by prompting the user to select one of positions on a monitor screen each position corresponding to one of the plurality of images printed on the printing paper.

22. A method comprising the steps of:

storing a plurality of data different from each other in a value on which a color appearance characteristic of a printout depends;

selecting, by a user, an important area of a subject image;

creating a plurality of test images, each test image being created by applying an individual one of the data to the important area of the subject image;

printing the test images;

outputting a set of markers, each marker corresponding to one of the printed test images, on a display screen;

retrieving a user selection of the markers; and applying the data used to create the test image corresponding to the selected marker to a printing operation;

wherein each of the set of markers comprises a graphical representation of the corresponding printed test image but not derived from the test image or subject image.

23. The method according to claim 22, wherein said step of applying the data comprises saving the data used to create the test image corresponding to the selected marker in a printer.

24. The method according to claim 23, wherein said step of storing comprises storing gamma data.

25. The method according to claim 23, wherein said step of storing comprises storing the data in an updateable table.

26. The method according to claim 23, wherein said step of storing comprises storing gamma data based on the subject image in an updateable table.

* * * * *